United States Patent
Wexler

(10) Patent No.: US 6,297,296 B1
(45) Date of Patent: Oct. 2, 2001

(54) LATEX COMPLEXES AS STABILIZED COLORANT

(75) Inventor: Allan Wexler, Vestal, NY (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/314,342

(22) Filed: May 19, 1999

(51) Int. Cl.$^7$ .............................. C03C 17/00; C09D 5/00; C09D 11/00; C08J 3/00; C08K 5/41
(52) U.S. Cl. .................. 523/160; 106/31.01; 106/31.13; 106/31.25; 106/31.27; 523/161; 524/155; 524/156; 524/157; 524/158; 524/159; 524/284; 524/394
(58) Field of Search ..................................... 523/160, 161; 524/155, 156, 157, 158, 159, 284, 394; 106/31.01, 31.13, 31.25, 31.27

(56) References Cited

U.S. PATENT DOCUMENTS

| | | | |
|---|---|---|---|
| 4,256,493 | * 3/1981 | Yokoyama et al. ............... 106/22 |
| 4,371,582 | 2/1983 | Sugiyama et al. . |
| 4,655,785 | 4/1987 | Reinert et al. . |
| 4,680,235 | 7/1987 | Murakami et al. . |
| 5,096,456 | 3/1992 | Reinert et al. . |
| 5,181,935 | 1/1993 | Reinert et al. . |
| 5,281,707 | 1/1994 | Fuso et al. . |
| 5,312,863 | 5/1994 | Van Rheenen et al. . |
| 5,534,051 | 7/1996 | Lauw . |
| 5,643,356 | 7/1997 | Nohr et al. . |
| 6,054,505 | * 4/2000 | Gundlach et al. ............... 523/160 |

OTHER PUBLICATIONS

J. Chem Soc. Dalton Trans. 1985, p. 1147—"Studies on Singlet Oxygen in Aqueous Solution. Part 2. Water–soluble Square–planar Nickel Complexes as Quenchers." Maria Botsivali, Dennis F. Evans, Paul H. Missen, and Mark W. Upton.

"Permanence of Ink–jet Prints: A Multi–Aspect Affair", M. Fryberg et al., Final Program and Proceedings of the Imaging Science and Technology (IS&T) Non Impact Printing (NIP)13: International Conference on Digital Printing Tech. (1997).

"Effects of Mordant Type and Placement on Inkjet Receiver Performance", L. Shaw–Klein, Final Program and Proceedings of IS&T NIP14: International Conference on Digital Printing Technologies (1998).

* cited by examiner

Primary Examiner—Patrick D. Niland
(74) Attorney, Agent, or Firm—Salzman & Levy

(57) ABSTRACT

The invention relates to the use of cationic latex particles that can complex with anionic dyes to provide water fastness and further to provide a medium in which inherently unstable anionic dyes can be brought in close proximity with other anionic components, by complexation to cationic latices, in order to stabilize the anionic dyes especially with regard to light and oxidative degradation. In particular this invention will provide for methods of generating waterfast and improved lightfast ink jet images.

4 Claims, No Drawings

LATEX COMPLEXES AS STABILIZED COLORANT

FIELD OF THE INVENTION

The present invention relates to the generation of an at least ternary complex comprising a cationic latex particle, an anionic dye, and at least one anionic stabilizing agent and; a method for generating ink jet recordings that have superior waterfastness and improved light fastness and articles manufactured therewith.

BACKGROUND OF THE INVENTION

An ink jet recording system is a system wherein fine droplets of ink are jetted and deposited onto a recording medium such as paper sheet or film transparency. The droplets are deposited in such a manner as to generate pictorial images or symbols such as alphanumeric characters. Ink jet recording systems offer many positive features compared to previous imaging systems in that these systems are typically, performed at high speed, noiseless, with no further chemical development or fixing required, reproducible, inexpensive, and can produce either monotone or full color renditions. Furthermore, under appropriate conditions the quality of the ink jet image is comparable to photographic pictures but can be formed in a single step without the need for toxic chemicals. Lastly, if changes to the final imaged copy are required, it is relatively simple to make corrections within the stored computer information that is then outputted to the printer to rapidly print a new copy. Such a turnaround using conventional photographic processes would require elaborate and multiple steps.

The rendition or image generated by the ink jet process must meet stringent criteria if it is going to be of significant commercial value. These criteria include: high printed dot density (optical density), bright and true colors (chroma), and rapid absorption of ink even in areas where multiple inks are required to prevent running or blotting. Additionally, the edges of the printed dots must be sharp, and the images themselves must be waterfast and should not fade with time. Three elements dictate the final quality of the ink jet image; the hardware system that generates the ink droplets, the ink receiving (recording) media and finally the ink itself. Depending on the specific criteria of concern one or more of these elements may need to be optimized.

With regard to the concern for waterfastness and light induced fading, the two most critical elements are the recording media and the ink formulation. Because of environmental and health concerns it has been desirable to use aqueous formulations for ink jet inks and therefore, for compatibility reasons, hydrophilic type recording media are often employed. Although this system can address the health and environmental concerns by providing a relatively low toxicity ink media, it causes the imaged recording medium to be problematic to subsequent contact with moisture, specifically the media itself is prone to tackiness or blocking and the imaged inks will tend to "bleed" and not be waterfast. Since the ink formulations are aqueous based, the colorant/dye within the aqueous formulation must themselves have high water solubility. To achieve this characteristic, low molecular weight organic dyes having solubilizing groups were typically selected. Water insoluble pigments have also been used but have special problems such as clogging of nozzle jets and low chroma in the printed image. As already mentioned these dyes have significant water solubility and if there are no strong binding forces holding the dye to the receiver medium then the dye will partially redissolve or completely enter the liquid aqueous phase and diffuse and "bleed" or "run off" the recording media when the image is wet inadvertantly or upon exposure to outdoor environment, or under high humidity conditions. The resulting image smear or complete loss of image is unacceptable for many applications. Another long standing problem known in the industry is that low molecular weight organic dyes are known to degrade especially on exposure to light and air. This degradation is accelerated when dyes are deposited on a receiving media where the dye is exposed over a large surface area. Typically this phenomenon of "light induced fade" or oxidative degradation of these dyes occurs over a period of time. Obviously these characteristics, water and light fastness, are readily apparent to the customer and are highly desirable. This is especially so for media that is intended for outdoor exhibition.

Efforts to enhance waterfastness and improve image quality by lowering dot spread have often employed dye mordants such as cationic polymers. These mordants fix the dye to the ink receptive layer and fix the dye close to the site at which the inkjet drop has been deposited. Unfortunately, while enhancing waterfastness mordanting often this results in a decrease in the light stability of the dye, see for example "Effects of Mordant Type and Placement on Inkjet Receiver Performance", L. Shaw-Klein, Final Program and Proceedings of IS&T NIP14:International Conference on Digital Printing Technologies (1998). It is further known in the ink jet technology literature, see U.S. Pat. No. 4,371,582, that anionic dyes can be fixed or mordanted to cationic latices via coulombic or electrostatic bonds. However the '582 patent does not disclose the simultaneous binding of dyes and stabilizers to the same latex particle nor does it teach what benefits would derive from such a combination.

The light induced fading of dyes is a well known problem in a variety of technologies such as textiles and more recently in ink jet reproductions. This defect has inhibited the growth of ink jet technology into the display market which requires the exposure of ink jet prints to both indoor and outdoor lighting for long periods of time, see for example "Permanence of Ink-Jet Prints: A Multi-Aspect Affair", M. Fryberg et al., Final Program and Proceedings of the Imaging Science and Technology (IS&T) Non Impact Printing (NIP) 13: International Conference on Digital Printing Technologies (1997)", herein incorporated by reference in its entirety. Incorporating antioxidants and UV absorbers directly into an ink receiving layer has been disclosed, see for example U.S. Pat. No. 4,680,235. This approach however is inferior to the current invention which causes the dyes and stabilizers to remain proximate due to complexation, since in the case of the prior art, dye and stabilizer only interact infrequently and solely by random chance. The use of antioxidant hindered phenols, see U.S. Pat. No. 5,096,456, and metal complex stabilizers, see U.S. Pat. No. 4,655,785, to improve the lightfastness of dyed textile fibers is known in the prior art. In the ink jet prior art, increased efficiencies of light stabilization are reported to be afforded when a stabilizer is proximate to the dye, see for example U.S. Pat. No. 5,643,356, column 16, lines 40–45 and example 11, herein incorporated by reference in its entirety. In the '356 patent, the technology employs a stabilizer covalently bound to a cyclodextrin via a chemical reaction, and then binding a dye to the modified cyclodextrin via an inclusion complex.

Having now disclosed the relevant problems associated with the current state of ink jet technology and the need for solutions to these problems the present invention will be described.

SUMMARY OF THE INVENTION

In light of the problems associated with the current state of ink jet technology the present invention addresses the specific areas of poor water fastness and poor light stability found when aqueous ink formulations are used to form ink jet images on hydrophilic receiver materials especially for materials that will be subjected to outdoor displays. Therefore, one object of the present invention is to design a waterfast ink jet image on a receiver material. Another object of the invention is to design a simple and direct method using cationic latices for proximally juxtaposing anionic dyes and stabilizers, without the need for chemical reactions, for the purpose of providing light stability to dyes that are inherently light sensitive. A yet further object of the invention is to enhance the light stability of mordanted dyes. A still further object is to enhance the light stability of dyes fixed to latex type mordants. Other objectives, aspects, features and advantages in addition to those discussed above will become more apparent from the following detailed description of the preferred embodiments when taken in conjunction with the claims appended hereto.

DETAILED DESCRIPTION OF THE PREFERRED EMBODIMENTS

The present invention comprises an at least ternary complex formed from the combination of a cationic or positively charged latex particle, an anionic organic colorant or dye, and at least one or more anionic stabilizing compound. Due to charge attraction the anionic dye and stabilizer components are tightly complexed to the surface of the cationic latex particle. When this occurs the dye and stabilizer molecules are brought into close proximity. This proximity allows for a highly efficient stabilization of the anionic dye especially to oxidative or light induced decomposition. It is known that the mechanism for such stabilization is often strongly dependent on distance between the dye and the stabilizer so the use of the cationic latex particle serves to provide the means for such close association. Without the cationic latex particle the anionic dye and the stabilizers would each be freely mobile and only under very high concentrations would association occur. Even under these highly concentrated conditions the anionic dye and stabilizer would have minimal interaction due to their similar electrical charges. Therefore the latex provides a means for bringing the dye and stabilizer into close proximity at very low effective concentrations. The cationic latex particle can range in size from 10 nm to 10 micron and may be of any three dimensional shape. Preferred size particles are between 50 nm and 500 nm, while most preferred is between 75 and 200 nm. The particle themselves may be homogeneous throughout or contain a seed component of different composition such as in a core-shell latex, furthermore the particle may also be hollow in its interior. In order to facilitate absorption of the ink vehicle into the ink receiving layer it is preferred that the latex particle not be filmforming under the conditions of manufacture and use, and therefore a Tg greater than 50C is recommended. A preferred cationic latex is available from Rohm and Haas and is commercially supplied as Latex PR-26. This latex is described in U.S. Pat. No. 5,312,863 herein incorporated by reference in its entirety, is composed of 28% solids dispersed in water and is comprised of 100 nm diameter particles having a significant percentage of the solids content composed of quaternized amino functionality (approximately 10 to 20% by weight). The latex is highly crosslinked with a Tg of about 65C, and is non filmforming. Examples of preferred cationic moities that are suitable for use in this invention include ammonium, alkyl ammonium, alkyl pyridinium, sulfonium, phosphonium, and the like. The latex may be produced by emulsion polymerization from any suitable monomer, for example, vinyl monomers, styrenic monomers, acrylate monomers (optionally bearing a cationic moiety) and methacrylate monomers (optionally bearing a cationic moiety), or any combination of these monomers provided that at least one of the monomers has or can be made to have (by subsequent alkylation) a cationic functionality. Specifically an amine monomer, once polymerized, can be quaternized.

There is no restriction on the dye except that it be an anionic organic dye. Most such dyes will contain ionized aromatic or aliphatic sulfonate, sulfate or carboxylate moieties on the dye nucleus (e.g., Tartrazine). Other examples of dyes useful in the invention include, Acid dyes, i.e., Acid Blue 45, Acid Black 2, Acid Red 8, Acid Red 52, Acid Yellow 23, Acid Blue 9, etc.; Reactive dyes, i.e., Reactive Black 5, Reactive Blue 2, Reactive Red 180 etc.; metal complex dyes ie. Reactive Blue 15, and Direct dyes such as Direct Blue 199, etc. Other suitable dyes can be found in U.S. Pat. No. 5,534,051, herein incorporated by reference in its entirety. It is preferred that the dye have a high extinction coefficient so that minimal amounts will provide sufficient optical density in the final imaged copy. Furthermore, since complexation with the cationic latex and later interaction with the recording medium may shift the spectral curve, it is recommended that the dyes should be selected based on their final chemical and physical environment and not based on curves obtained from an aqueous medium alone. The amount of dye that can be used in the present invention is dependent on the charge of the cationic latex. It is most desirable either to neutralize the cationic charges on the latex which precipitates the complex, or to maintain an overall excess of cationic charge (positive charge), i.e. sub-neutralize the latex which leaves the complex suspended. If the amount of anionic materials exceeds that required to precipitate the complex then the excess anionic materials will not be complexed to the cationic latex and this will be detrimental to the overall objectives of the invention. It is further desirable to have a 1:1 ratio of the anionic stabilizer to the anionic dye, however ratios from 1000:1 to 1:1000 are permissible. Working Example 1 reveals that approximately 1.3 gm of cationic Latex PR-26 can effectively complex with 1 mmole of anionic dye (Tartrazine) and 1 mmole of anionic stabilizer (Uvinul).

The stabilizers can be any anionic substances which are either an antioxidant, an excited state quencher, a UV absorber or a substance which can function in any combination of the stabilizing capacities. More specifically the antioxidant can be a sulfonated hindered phenol as disclosed in U.S. Pat. No. 5,096,456, herein incorporated by reference in its entirety, the excited state quencher can be a sulfonated metal complex as disclosed in U.S. Pat. No. 4,655,785 and J. Chem. Soc. Dalton Trans. (1985) p. 1147, both herein incorporated by reference. The UV absorbers can be a sulfonated o-hydroxy benzophenone as described in U.S. Pat. No. 5,181,935, herein incorporated by reference in its entirety and as marketed under the tradename, UVINUL, by the BASF Corporation. Other preferred UV absorbers include sulfonated o-hydroxybenzotriazoles as described in U.S. Pat. No. 5,181,935, herein incorporated by reference in its entirety, sulfonated o-hydroxy triazines, sulfonated hindered amines, as described in U.S. Pat. No. 5,281,707, herein incorporated by reference in its entirety, sulfonated triazines, sulfonated enones and the like. Multifunctional stabilizers which include on a given stabilizer molecule combinations of the above stabilizer types are also included. Both near and far UV absorbers are beneficial in the present invention.

In one embodiment of the invention, the ternary complex is formed by sub-neutralizing the cationic latex by first adding an aqueous solution of the dye to a suspension of the latex. After a period of time necessary to complex the dye to the latex, as evidenced by ultraviolet-visible spectroscopy, the anionic stabilizer is added to the suspended binary complex. In another embodiment of the invention the process of adding the stabilizer and the dye are reversed. It is also conceivable to add the dye and the stabilizer simultaneously to the cationic latex. It is noted specifically that any order of addition of the three components to generate the ternary complex is within the scope of this invention. If the ternary complex thus formed is sub-neutralized relative to the latex, then the ternary complex will remain in suspension, otherwise the complex will precipitate.

In one aspect of the invention it is envisioned that the sub-neutralized ternary complex will be part of the inkjet ink formulation and will be applied to the receiving layer of the recording media via an inkjet printhead. As will be further explained, another preferred embodiment is to add the anionic stabilizer to the cationic latex to form a sub-neutralized binary complex. This binary complex is then incorporated into an ink receiving layer, described hereinbelow, of a recording medium. In this embodiment there remain free cationic sites for the anionic dye that will later be provided by the ink. In this case the inkjet ink formulation will contain the dye, and upon application from an inkjet printhead, will form the ternary complex in-situ (i.e. within the receiver layer). In another embodiment the cationic latex is incorporated into the receiving layer as part of its coating formulation and both the anionic dye and the anionic stabilizer are formulated in the ink, the ternary complex forming in-situ in the imaged areas of the recording medium. GreLiter than ternary complexes, incorporating two or more anionic stabilizers simultaneously bound to the latex along with the dvc. are included within the scope of the invention. Lastly, the complexes might comprise additional components to assist in benefiting other aspects of the final imaged recording media.

When the ternary complex is used in an ink jet application a recording medium is necessary to generate the final image. This recording medium can be comprised of either film or paper support depending on the final mode of viewing, essentially no limitations, except as described hereinbelow, impact the selection of usable support materials. In the present invention standard paper, manufactured by traditional methods and containing standard additives, such as sizing agents, dye fixing agents, fluorescing agents, and hydration resisting agents can be acceptably used. Other acceptable paper supports include cast coated and resin coated papers. Paper or opaque film supports are used when the image is to be viewed under reflected light, in these cases the imaged recording medium can resemble a photographic print. If transparent film is used as the support, the image is typically viewed under transmitted light that passes from the obverse (imaged) side to the reverse side or vice versa. The transparent films can be used in an OHP (overhead projection) mode or in large display media that is intentionally backlit. In both cases, whether opaque or transparent film support is contemplated an additional receiving layer is required. This layer is coated on at least one surface of the film support to provide a receiving layer for the jetted ink formulation. The receiving layer is typically comprised of a hydrophilic polymeric material to absorb the applied ink formulation. Generally any polymer soluble in or swellable in water, or mixture of polymers which are so, for example gelatin and PVP, are common mixtures in inkjet receiver layers (IRLs). The preferred hydrophilic polymers include: poly(vinyl alcohol), poly(2-ethyl-2-oxazloline), hydroxyethyl cellulose, methyl cellulose, hydroxypropyl methylcellulose, poly(vinyl pyrrolidone), copolymers of vinylpyrrolidone, gelatin, water-soluble polyesters. The hydrophilic material may also comprise a mixture of such materials. which may be fully compatible or may phase seperate. Either circumstance is within the accepted bounds of the invention. The hydrophilic polymer may be crosslinked to provide an insoluble, yet hydrophilic medium. An example of such a material is gelatin that has been crosslinked either prior to or during coating with materials such as bisvinyl sulfones dimethylol urea etc. Layer thickness for the hydrophilic receiving layer is not critical to the design of the invention but layer thicknesses of 0.5 to 200 micron are usable, and 1 to 40 micron are preferred and 2 to 10 micron are most preferred. It is also within the scope of this invention to have a multilayer coating on the support. For example, a two layer structure may consist of an upper image receiving layer and a lower layer which functions to assist in absorption of the ink vehicle. The receiving layer is the layer where the dye image is captured. The receiving layer may then be the uppermost layer or any of the inner layers between the uppermost layer and the support, the only requirement is that the applied ink formulation be able to diffuse to the receiver layer. The receiving layer may optionally contain other components to enhance the objectives of the invention. Such components might include fillers to assist in absorption of the ink vehicle, fluorescing agents, antitacking agents such as hydrophobic resins such as SBR latex and polyvinyl acetate, antiblocking agents such as silica particles or polymeric beads such as polymethylmethacrylate. If the receiving layer is used in combination with a transparent film support for viewing images with transmitted light, it is particularly preferred that the components of the receiving layer do not diminish the optical transparency of the recording medium. Therefore the amount of antiblocking agents, in particular, is limited by this requirement.

In the case of a plain paper support, the receiving layer is optional since the paper, by itself, can act as a hydrophilic receiving layer. In this circumstance the objects of the invention would be incorporated within the paper during the paper making process. In the cases of cast coated and resin coated papers the objects of the invention would be incorporated into the ink receiving layer. In cases where "photoreal" prints are required it is anticipated that the paper support will be coated with a hydrophilic receiver layer of similar composition to that previously described for the film supports.

When a single receiver layer is coated on the support it is an optional feature of the present invention that an anticurl backcoat layer will be required to maintain flatness of the coated support under various relative humidity conditions.

When both sides of the support are coated with a receiver layer it is a preferred feature of the present invention that both sides can then be imaged with jetted ink. This is a most preferred embodiment for opaque supports.

The coating of the receiver layer can be performed by any of the known coating methods such as slot coating, cascade coating, curtain coating, air knife coating, blade coating dip coating, gravure coating, etc. The type of coating application will influence the coating formulation of the receiving layer but typically the formulation will comprise a surfactant package to assist in reducing coating defects and assist in uniform ink absorption during the imaging step, a material to modify the gloss characteristics of the coated recording medium, and a matting agent to relieve potential blocking problems.

In a preferred embodiment of the present invention it is envisioned that the sub-neutralized binary complex of cationic latex and anionic stabilizer will be incorporated into the ink receiving layer of all the film or the paper supports described hereinabove.

If the cationic latex or binary complex are not incorporated into the receiver layer then the aforementioned sub-neutralized ternary complex will be incorporated into the ink jet ink formulation that will be applied to the receiving layer of the support. In this preferred embodiment, a single ternary complex is required for a monochrome image or a minimum of three separate ternary complexes are required for full color renditions. Each separate ternary complex formulation would then be jetted from separate print heads.

The inks that are useful in the present invention comprise aqueous formulations including water or water/organic solvent. When solvents are employed they are typically selected from the low molecular weight alcohols, ketones, ethers and esters. The ratio of water to solvent can be any ratio but it is preferred from environmental and safety reasons to have the minimum amount of solvent present in the formulation. Typically the concentration of organic solvent is selected by determining the minimum amount of solvent necessary to insure that other components in the ink, particularly the anionic dye, remain in solution and do not clog the printhead. A preferred ratio of solvent to water is 2:5, and a most preferred ratio is 1:10. In one preferred embodiment the ink formulations contain uncomplexed anionic dye. The anionic dyes, as described hereinabove, are selected from the large collection of organic and organometallic dyes encompassing direct, acid, food, and vat.dyes. Typically these dyes contain a water solubilizing functionality that is anionic in nature, such as sulfonate, sulfate, carboxylate, or phosphate, or may additionally contain polyethylene oxide moieties. The useful dyes for the present invention will have solubility in the aqueous solvent described hereinabove to provide sufficient optical density in the imaged recording media. Typical concentrations of the anionic dyes in the ink formulations are from about 1 to about 200 gm/l. Preferred concentrations are from about 3 to about 50 gm/l.

In the above embodiment the ternary complex comprising an anionic dye, an anionic stabilizing agent, and a sub-neutralized cationic latex described hereinabove is used in place of the uncomplexed anionic dye. This complex can be formed prior to inclusion into to ink formulation or in situ. The ternary complex is preferably held in dispersion form in the ink formulation, therefore the formulation should be designed, and should contain, additional components to eliminate the potential for settling of the complex. This is typically achieved by using cationic latex particles no larger than 500 nm. Preferred sizes in the current invention include from about 10 nm to about 400 nm, highly preferred sizes include from about 10 nm to about 200 nm, and most highly preferred sizes include from about 10 nm to 100 nm micron. The amount of ternary complexed latex will depend on there being sufficient dye concentration to provide an image with acceptable optical density in imaged areas of the recording medium. Useable concentrations range from about 3 gm/l to about 400 gm/l. Preferred concentrations range from about 10 gm/l to about 200 gm/l, and most preferred concentrations range from about 25 gm/l to about 100 gm/l.

The ink formulations can further contain additional components as is typically used in standard ink jet formulations, These components might include anticlogging agents such as polyhydric alcohols, organic or organometallic bactericides, surfactants for providing uniform coating application to the receiving layer of the recording medium and to assist in absorption of the complexed or uncomplexed dye to the receiving layer.

These ink formulations can be applied to the recording medium by using any ink jet print head devices including those comprising piezo, bubble jet, and thermal applicators.

WORKING EXAMPLES

Example 1

Suspensions of PR-26 latex were prepared in concentrations ranging from 0 to 30% solids. Two milliliters of each were then added to a 0.017M Tartrazine solution to afford the latex to dye ratios in the table below. Upon addition of the latex to the dye solution a precipitate was noted and the sample was centrifuged for two minutes. Following centrifugation, aliquots of the supernatant were removed, diluted and spectra recorded. A sharp decline in the optical density of the dye was found up to an equivalence point near 1.4 g latex/mmol dye. The appearance, beyond the equivalence point, of a longer wavelength absorbance and the absence of centrifugate, corresponds to the formation of the dispersed sub-neutralized binary latex dye complex.

| Gms PR-26 Latex/mmol Tartrazine | Absorbance | λmax |
|---|---|---|
| 0.0 | 0.7 | 426 |
| 0.75 | 0.4 | 426 |
| 1.25 | 0.04 | 426 |
| 1.6 | 0.58 | 434 |
| 2.0 | 0.6 | 434 |
| 2.4 | 0.62 | 434 |
| 2.6 | 0.64 | 434 |

Example 2

As per example 1, aqueous suspensions of PR-26 latex were prepared in concentrations ranging from 0 to 30% solids. To a 1% solution of Uvinul DS 49 stabilizer was added the aqueous suspensions to give the latex to Uvinul ratios in the table below. Again precipitation was noted and the samples were centrifuged for two minutes, aliquots of the supernatant were diluted and spectra recorded. The optical density results demonstrate that there is again a sharp decline in the optical density at an equivalence point near 1.3 g latex/mmol stabilizer. The rise in optical absorbance after the equivalence point and the absence of centrifugate corresponds to the reformation of the dispersed sub-neutralized latex-stabilizer binary complex.

| Gms PR-26 Latex/mmol Uvinul | Absorbance |
|---|---|
| 0.0 | 1.0 |
| 0.5 | 0.6 |
| 0.8 | 0.42 |
| 1.3 | 0.04 |
| 1.6 | 1.08 |
| 2.0 | 1.05 |
| 2.5 | 1.0 |
| 2.8 | 1.02 |

Example 3

A binary complex of Uvinul and PR-26 cationic latex was prepared having nearly one half of the cationic sites complexed with Uvinul. The amounts of latex and Uvinul were based on the previous Example 2 where the equivalence point was determined to be near 1.3 gms Latex/ mmol Uvinul. Therefore, for this example, a mixture of 2.6 gms Latex/mmol Uvinul was prepared (i.e. about half the sites were complexed). This sub-neutralized binary latex stabilizer complex was then used to titrate the Tartrazine dye. The data below reveals the equivalence point is now found near 2.7 gms latex complex/mmol Tartrazine, or about twice that for the latex itself. Thus both the dye and stabilizer are simultaneously bound to the latex particle affording the ternary complex of the invention.

| Gms Latex complex/mmol Tartrazine | Absorbance ($\lambda$max 426 nm) |
|---|---|
| 0.0 | 0.511 |
| 0.9 | .241 |
| 1.8 | 0.041 |
| 2.72 | 0.030 |
| 4.55 | 0.480 |
| 6.37 | 0.496 |
| 8.19 | 0.550 |

Example 4

Two coatings were prepared on a resin coated paperbase Schoeller Tech 150. The coatings each had an underlayer coated from a solution of 8% acid ossein gelatin (Croda Colloids) using a #32 wire wound rod. After drying of the underlayers there was coated using a #10 wire wound rod on the dried underlayers:

A—An overcoat layer from a solution prepared by adding 8.8 cc of a PR-26 latex containing solution "A" to 50 cc of 1% acid ossein gelatin. The PR-26 latex containing solution "A" was prepared by adding 7 cc PR-26 latex to 50 cc DI water.

B—An overcoat layer from a solution prepared by adding 8.8 cc of a sub-neutralized latex-stabilizer complex solution "B" to 50 cc of 1% acid ossein gelatin. The sub-neutralized latex-stabilizer complex solution "B" was prepared by adding 7 cc PR-26 latex to 50 cc of 1% Uvinul DS 49 (note: 3 cc PR-26 gave the fully neutralized complex).

The above dried two layer coatings were then printed using an Iris 5015 inkjet printer with a test target which generated pure cyan, magenta, yellow and black scales. Samples of the printed areas were placed into the trays of an Atlas HPUV Fadeometer generating a measured light intensity of 5.9 watts/m$^2$ visible and 1.7 watts/m$^2$ UV containing light. The initial and 25 hour L* a* b* values were measured on a Hunter MiniScan XE instrument operating at D65 daylight and 10° observer, and are tabulated for the yellow dye 50% density patch.

| Coating A | L* | a* | b* | Coating B | L* | a* | b* |
|---|---|---|---|---|---|---|---|
| Initial | 89.67 | −5.48 | 50.71 | Initial | 89.71 | −5.78 | 52.95 |
| 25 Hours | 92.58 | −4.92 | 24.39 | 25 Hours | 91.60 | −6.11 | 37.79 |

The data demonstrate that the ternary complex of the invention has reduced the yellow dye fade in the inkjet printed image.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A complex comprising:

a) an anionic dye, b) at least one anionic stabilizer, and c) a cationic latex;

wherein amounts of said anionic dye, said anionic stabilizer, and said cationic latex in said complex are determined by having essentially equal or greater amounts of cationic charges from said cationic latex than anionic charges from said anionic dye and said anionic stabilizer and further;

the ratio of said anionic charges from said anionic dye to said anionic charges from said anionic stabilizer in said complex is in the range of about 1:1000 to about 1000:1.

2. The complex as described in claim 1 wherein the amounts of said anioinic dye and said anionic stabilizer do not cause precipitation of said complex.

3. A method of manufacturing the complex, as described in claim 1, comprising the steps of:

a) providing an anionic dye, b) providing at least one anionic stabilizer, c) providing a cationic latex, d) mixing said anionic dye, said anionic stabilizer and said cationic latex simultaneously or in any sequential order.

4. An essentially aqueous ink jet ink formulation comprising said complex from claim 1.

* * * * *